(12) United States Patent
Inman et al.

(10) Patent No.: US 6,516,590 B2
(45) Date of Patent: Feb. 11, 2003

(54) BAGGING MACHINE HAVING FEED CONTROL

(75) Inventors: Larry R. Inman, Warrenton, OR (US); Michael H. Koskela, Astoria, OR (US); Ken Sevy, Melba, ID (US)

(73) Assignee: Ag-Bag International Limited, Warrenton, OR (US)

( * ) Notice: Subject to any disclaimer, the term of this patent is extended or adjusted under 35 U.S.C. 154(b) by 58 days.

(21) Appl. No.: 09/851,702

(22) Filed: May 8, 2001

(65) Prior Publication Data
US 2002/0166309 A1 Nov. 14, 2002

(51) Int. Cl.[7] .............................. B65B 1/10; B65B 57/10
(52) U.S. Cl. .............................. 53/493; 53/573; 100/65; 100/145; 100/45
(58) Field of Search .................. 53/493, 567, 579; 100/45, 65, 144, 145

(56) References Cited

U.S. PATENT DOCUMENTS

| | | | | |
|---|---|---|---|---|
| 3,687,061 A | * | 8/1972 | Eggenmuller et al. | 100/45 |
| 4,310,036 A | * | 1/1982 | Rasmussen et al. | 100/112 |
| 5,413,155 A | * | 5/1995 | Ryan | 100/100 |
| 5,860,271 A | * | 1/1999 | Inman et al. | 53/567 |

* cited by examiner

*Primary Examiner*—John Sipos
(74) *Attorney, Agent, or Firm*—Robert L. Harrington

(57) ABSTRACT

A system for compacting organic material such as silage and inserting compacted material into an elongate plastic bag. A feed table delivers material to a rotor that propels and compacts material into an inlet of a tunnel. A proportional valve controlling the hydraulic motor of the feed table controls the rate of which the feed table delivers material. A speed sensor senses the speed of the rotor and transmits a signal to the control unit connected to the proportional valve of the feed table. Overfeeding of material to the rotor results in a reduction of the rotor speed. Such reduction is sensed and the feed table delivery rate adjusted accordingly to optimize filling of the bag.

3 Claims, 5 Drawing Sheets

US 6,516,590 B2

BAGGING MACHINE HAVING FEED CONTROL

FIELD OF THE INVENTION

This invention relates generally to machines used to fill bags with agricultural material, such as silage. The invention more particularly relates to the optimization of feed table speed via the addition of an electronically automated feed table control.

BACKGROUND OF THE INVENTION

A bag filling machine and process as contemplated by the present invention involves placing silage material onto a feed table that runs toward a rotor connected to the inlet of a tunnel. The back of the tunnel is open and a bag secured to the tunnel receives the material conveyed by the feed table.

Ideally the silage deposits evenly on the feed table and is fed at a constant rate to optimize the filling of the bag. However, silage is a clinging material that does not readily flow. It is commonly delivered to the feed table in trucks and the material from the trucks is deposited as a sequence of large clumps. These large sequential clumps result in intermittent overloads and underloads with respect to feeding of the rotor. When the large clumps are fed into the rotor, the rotor often becomes clogged and overloaded. This in turn causes the speed of the rotor engine to decrease (circular). Presently, an operator manually slows, stops or even reverses the feed table to allow the overload to dissipate. However, by the time an operator is aware of the overload problem and then responds to that overload, a significant build up of silage at the rotor has occurred. Repeated overloading undesirably slows the overall filling of the bag. It is accordingly an object of the present invention to control silage feeding to the rotor automatically so as to minimize build up of silage at the rotor and thereby optimize filling of the bag.

BRIEF SUMMARY OF THE INVENTION

In accordance with a preferred embodiment of the invention, a feed table measuring in the order of 8 feet in width and 15 feet in length receives truck loads of material, i.e., in the form of large and small mixed clumps of material. The feed table forces the clumps toward the rotor first engaging one or more beater bars (to at least partially break up the clumps) and then into the rotor that packs the silage into the machine's tunnel where the material is compacted and then expelled into a storage bag. The feed rate is optimized at the highest feed table speed which does not lower rotor speed. It was determined that detection of overloading and quickly initiated controlled decreasing of the feed rate of the feed table prevents material build up at the rotor and provides for rapid recovery of rotor speed when slow down does occur.

An engine speed sensor is utilized to sense the reduction of rotor RPM. The engine speed sensor is connected to a control unit that in turn is connected to a proportional valve which meters hydraulic fluid to the hydraulic motor that drives the feed table. The proportional valve controls the volumetric flow rate of hydraulic oil flow to the feed table motor. By varying the orifice size of the proportional valve, the volumetric flow rate is increased or decreased (within established limits) and thereby dictates the feed rate of the feed table. Accordingly, the control unit receives a signal that indicates an overload. The control unit causes the proportional valve of the feed table motor to reduce orifice size decreasing the feed rate of the feed table. This occurs quickly and continuously as does increasing of orifice size upon increase of the engine's speed (in RPM).

The invention will be more clearly understood and appreciated upon reference to the following detailed description and accompanying drawings.

DESCRIPTION OF THE PREFERRED EMBODIMENT

Figure 1:
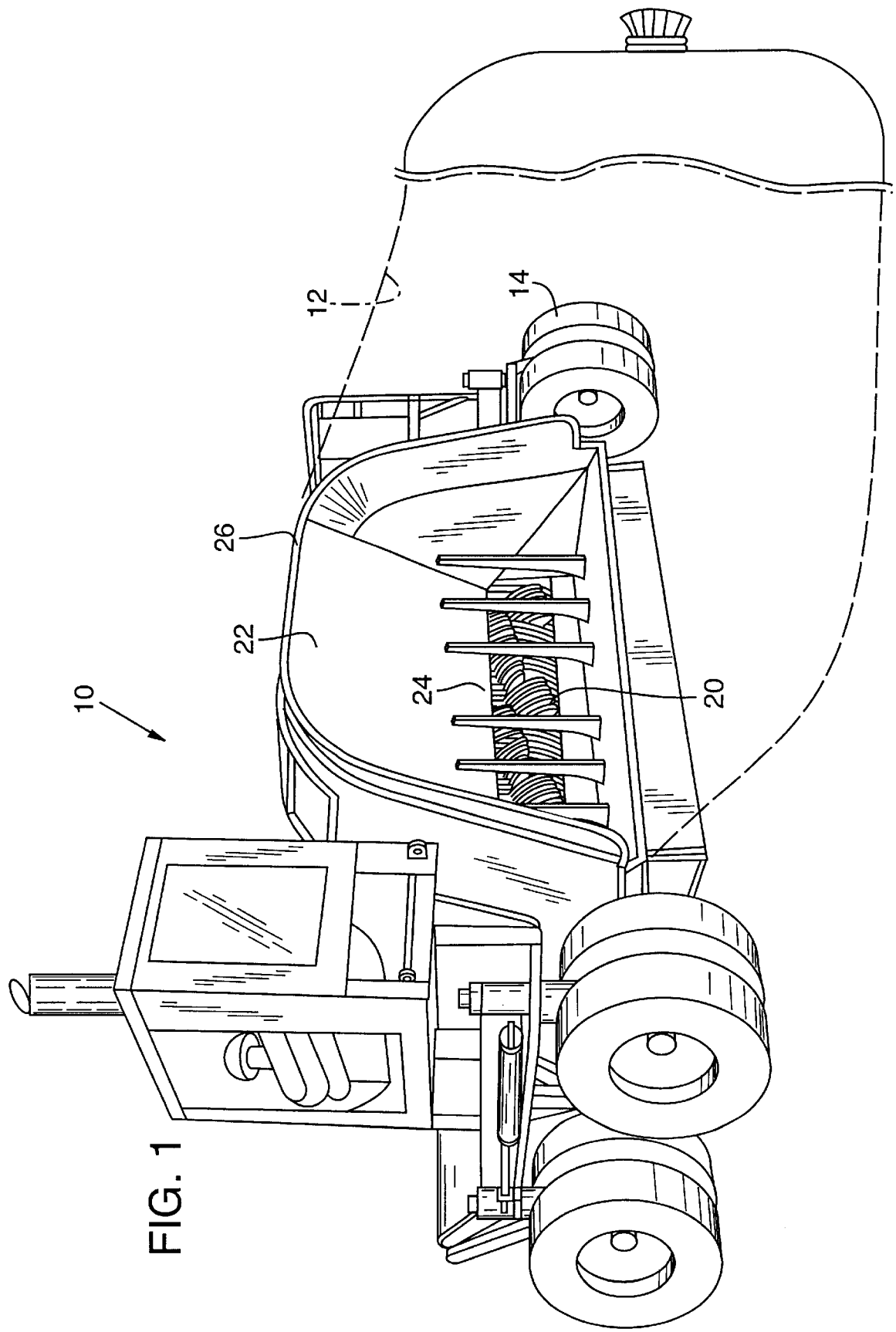
FIG. 1 is a perspective view of the rearward side of the bagging machine such as may incorporate the present invention.
Figure 2:
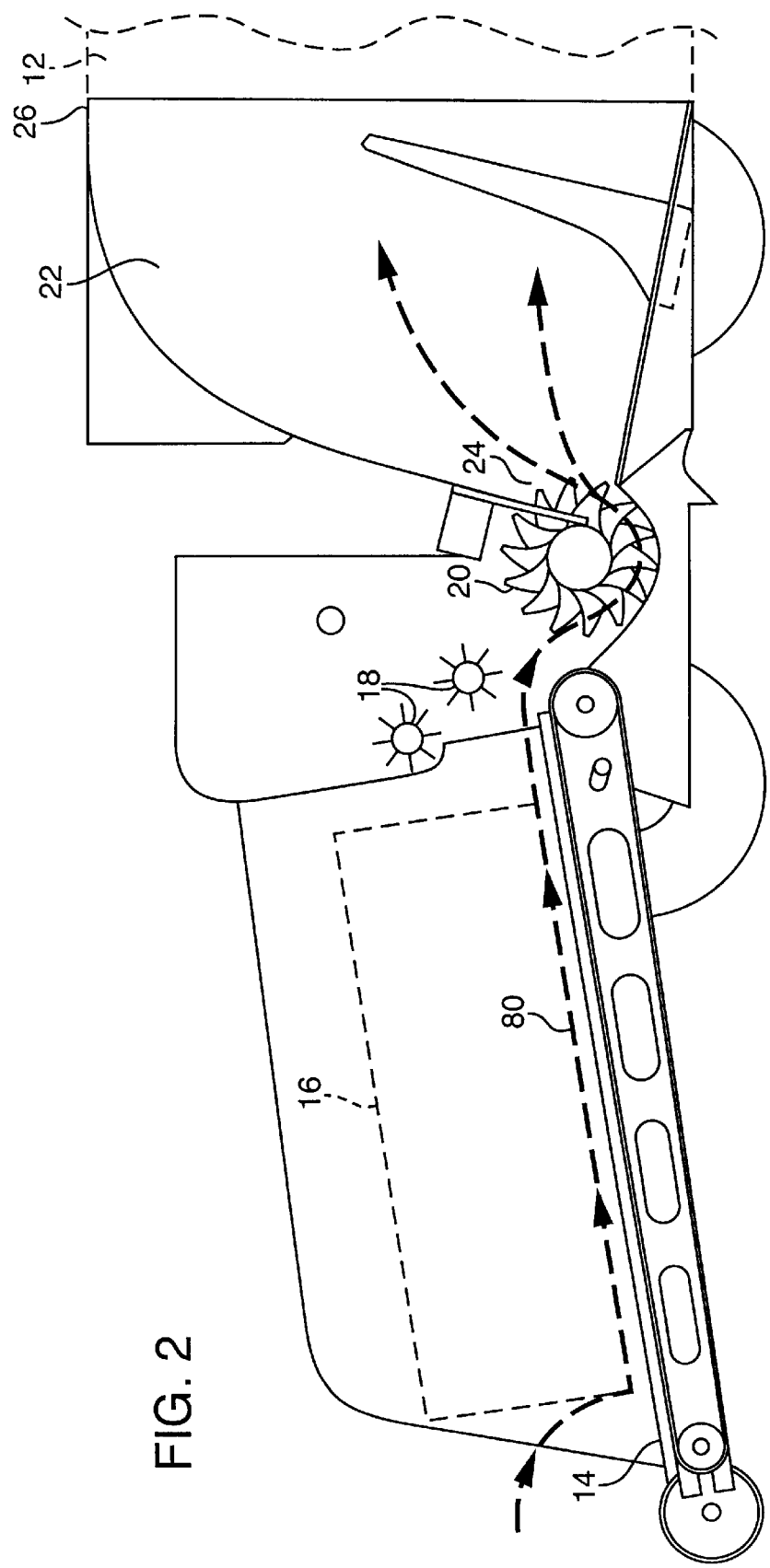
FIG. 2 is a side view in diagram form of the machine of FIG. 1 illustrating the flow path of the material through the machine of FIG. 1.

FIGS. 1 and 2 illustrate a machine 10 arranged to insert organic material such as silage into an elongate plastic bag 12. The machine 10 includes a feed table 14 (See FIG. 2) for receiving the organic material that is to be inserted into the bag 12. The feed table 14 is designed to receive dump truck loads of chopped silage that are deposited on the feed table (feed table dimensions: e.g., 8 feet wide and 15 feet long) as large clumps 16. The feed table 14 delivers the organic material to a rotor 20. Rotating beater bars 18 may be employed to help break down the silage clumps and direct flow of the material downwardly into the rotor 20. The rotor 20 is rotatably mounted strategic to an inlet 24 of a tunnel 22. The tunnel 22 has an outlet defined by the tunnel's rearward end 26 (FIG. 1) on which the bag 12 is mounted in a folded or gathered condition.

The rotating rotor 20 is arranged to force feed the material into and through the tunnel 22 to fill the bag 12 with material in a compacted state. The material is desirably fed to the rotor at a constant rate, a rate that approaches but does not exceed its material handling capability. To achieve this objective, the feed table feed rate is varied to match the rotor capability.

Figure 3:
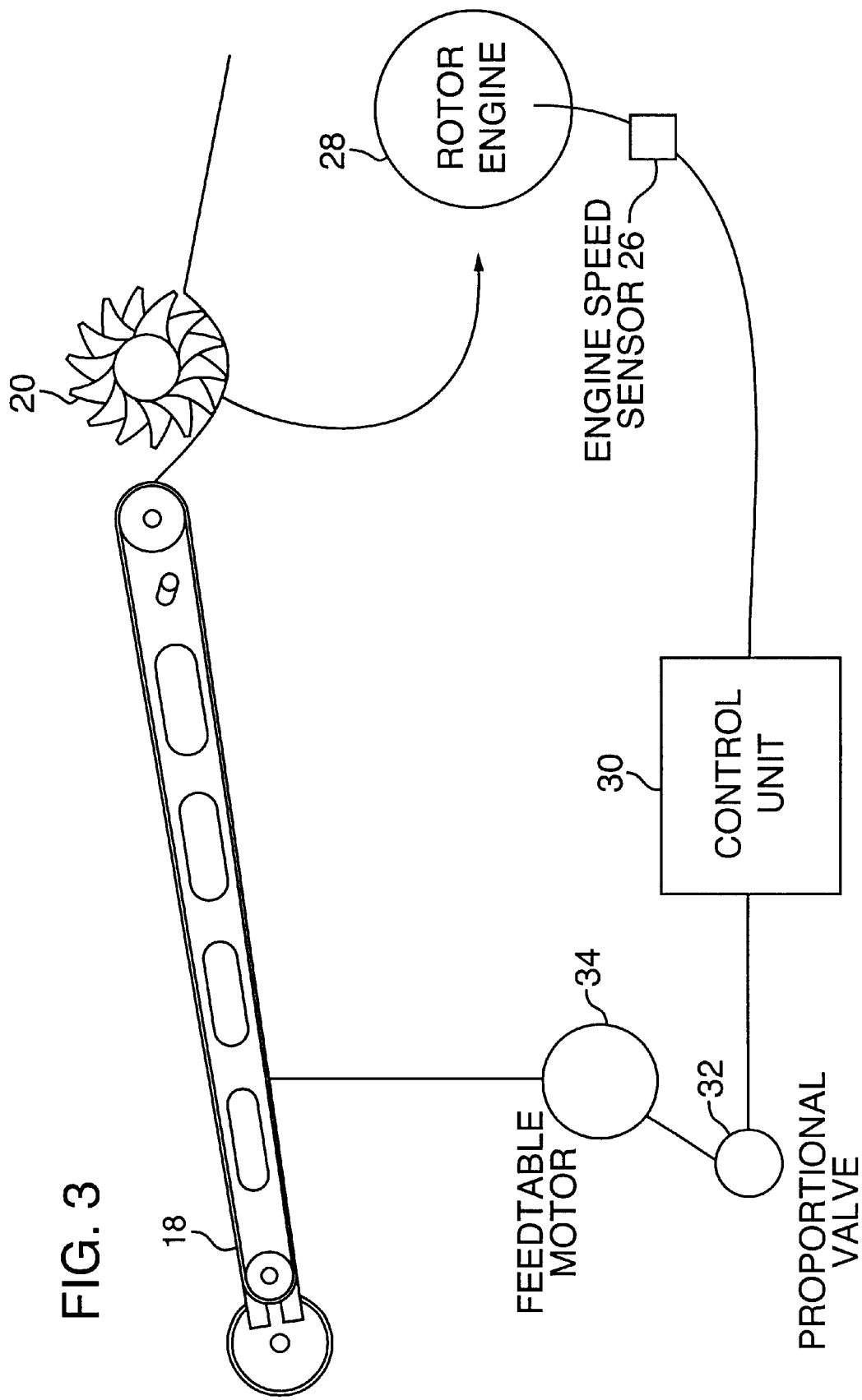
FIG. 3 is a diagram of the connection among the sensor, control unit and proportional valve of the machine of FIG. 1.

A feed table control or regulator assembly is illustrated schematically in FIG. 3. The rotor 20 is mechanically linked and driven by rotor engine 28. An engine speed sensor 26 is located in the housing of the rotor driving engine 28 (shown separately in FIG. 3 for illustration purposes) and connects to a control unit 30 that in turn is connected to a proportional valve 32 of the feed table's hydraulic motor 34. The engine speed sensor 26 may be provided in varied configurations. In one embodiment, a Hall Effect sensor is placed in the bell housing area of the rotor driving engine. The engine speed sensor 26 senses the angular velocity of the rotor's engine 28 by creating a pulse each time a tooth of the fly wheel passes by (the fly wheel being connected to the crank shaft of the engine) and thus indicates the rotor speed.

The desired RPM range for the rotor engine is, e.g., between 1,800 and 2,000 RPM. The feed table 18 has a feed rate that varies, e.g., between zero and 20 feet per minute.

The engine speed sensor 26 transmits a signal to the control unit 30 that is proportional to the speed of the rotor engine. It may be determined that for a particular material to be bagged, the feed rate of the feed table at 20 feet per minute is best with the engine speed at 2,000 RPM. When the control unit 30 senses a decrease of engine speed below 2,000 RPM, (indicating an overload condition) the control unit 30 immediately causes the partial closing of the proportional valve 32. The partial closing of the proportional valve 32 slows the feed rate of the feed table 18. If the control unit 30 senses a continued decrease in the speed of the rotor engine 84, the control unit 30 will further cause the closing of the proportional valve 32 to the point of fully closing the proportional control valve to thereby stop the feed table 18. Again, this latter point is variable and can be set, e.g., at an engine speed of 1,600 RPM.

This system is based on the theory that processing capacity is proportional to engine speed. When engine speed decreases, processing capacity proportionally decreases. As engine speed increases, processing capacity also increases and product input rate can be increased. Accordingly, an overload that forces the engine to lug down is detrimental to processing efficiency and must be minimized. However, on the other side of the equation, if material is not fed fast enough to the rotor, processing capacity will be under utilized.

Figure 5:
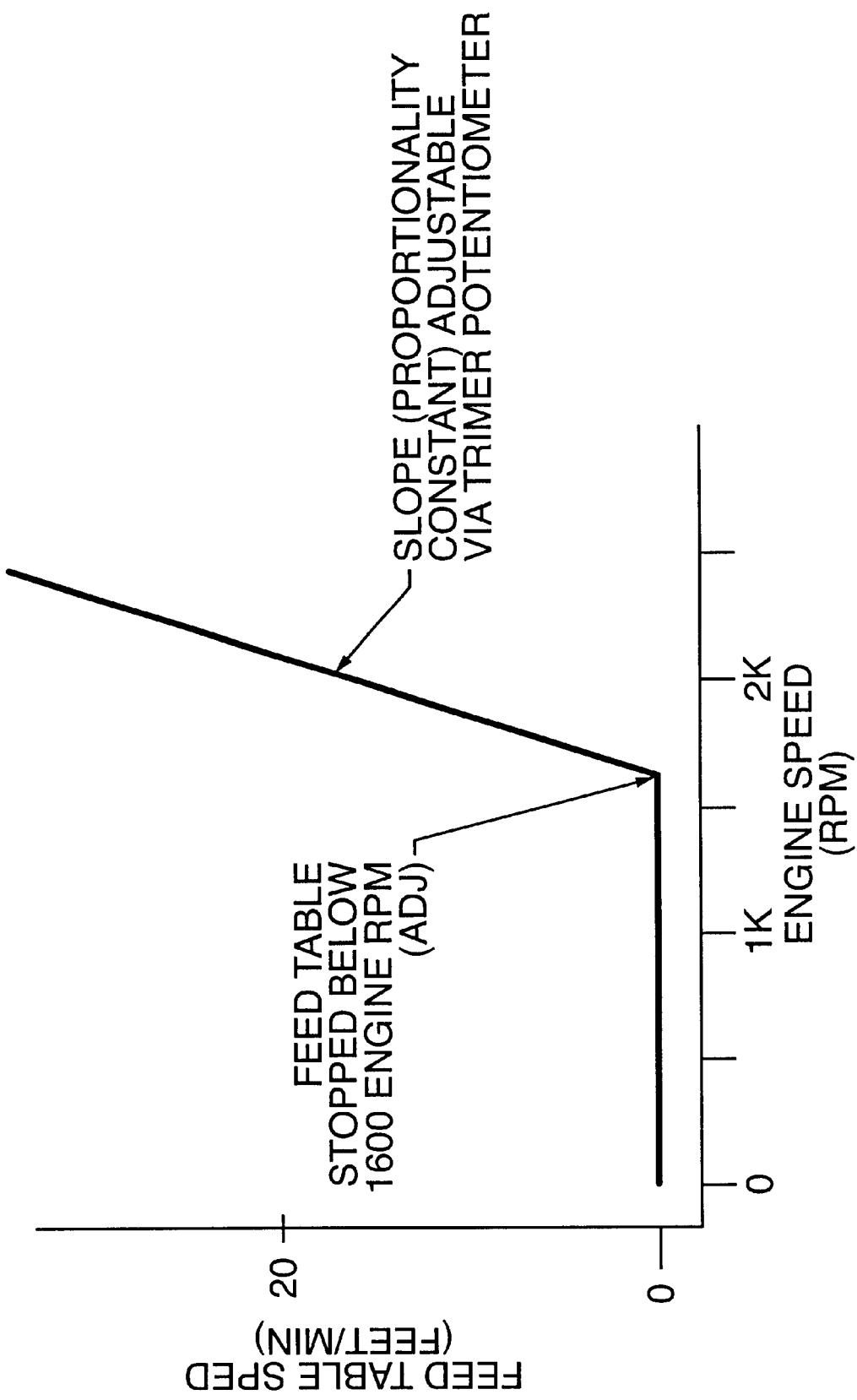
FIG. 5 is a chart indicating the correlation between the engine speed and feed table speed.

There are two zones in the engine's usable RPM range illustrated by the chart of FIG. 5. A split is established, e.g., at approximately 1,600 RPM. Above 1,600 RPM, feed table speed is controlled so as to be linearly proportional to engine speed, e.g., engine speed between 1,600 and 2,000 RPM is matched to the feed table feed rate between zero and 20 feet per minute. In the second zone, i.e., below 1,600 RPM of the rotor, feed table speed is set at zero. This allows the machine to recover in case of overload and also causes the belt to be stopped when in low idle mode waiting for more product to be delivered to the machine.

The feed table control system's main purpose is to automate previously manual operations. Increase in efficiency will result through such automation. A peripheral benefit of the control system is protection against equipment abuse from overloading the engine, clutch, rotor, bearings, feed table belt, etc.

Figure 4:
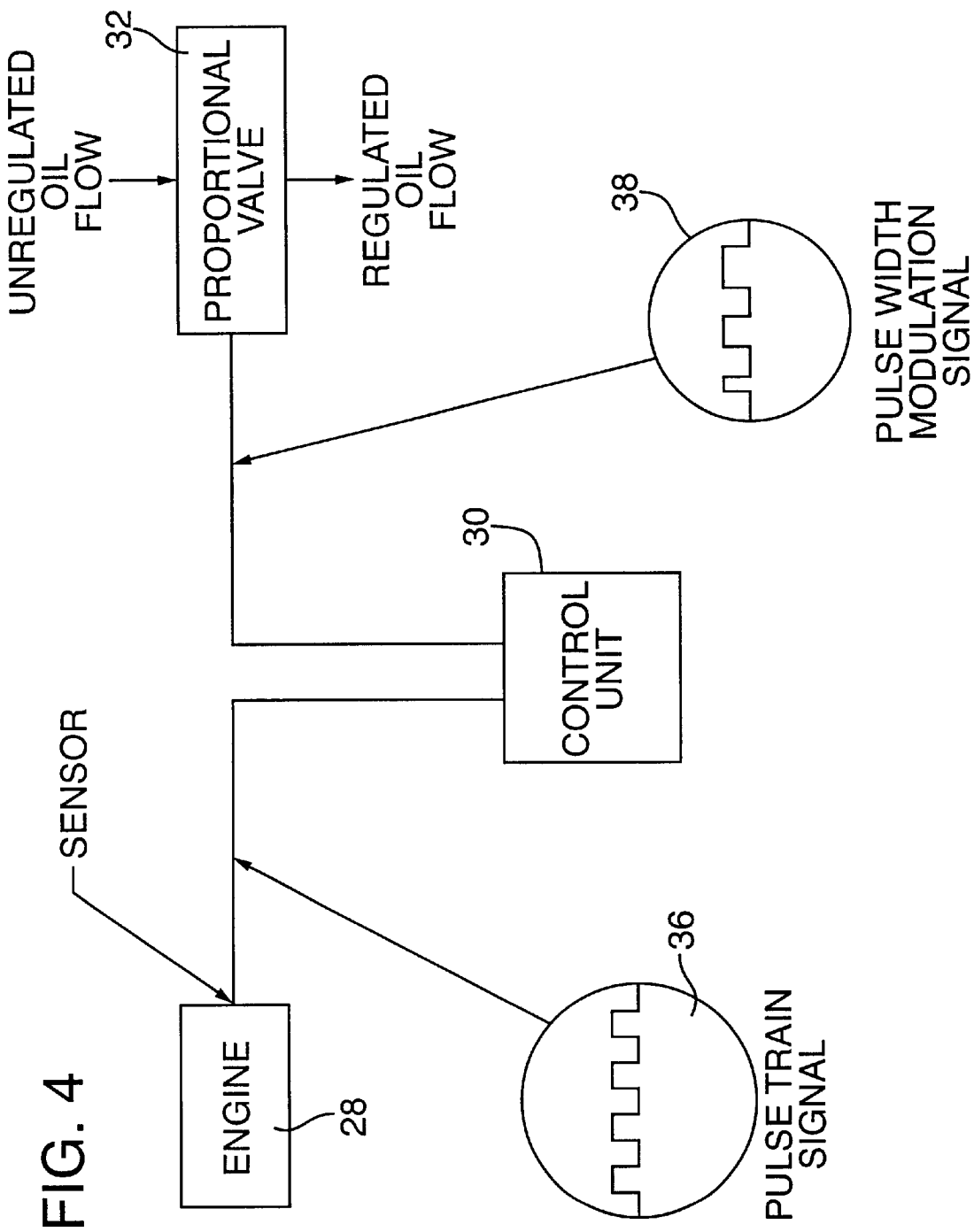
FIG. 4 is a schematic illustration of the control assembly.

The operation of the control assembly is schematically illustrated in FIG. 4. From FIG. 4, the speed (in RPM) of the engine 28 is converted to an electrical signal by the sensor 26. The electrical signal of the sensor 26 is indicated by reference 36 and as noted is a constant duty cycle output whose frequency is directly proportional to the engine's angular velocity. The control unit 30 converts the frequency of sensor 26 into a variable duty cycle (constant velocity, constant amplitude) output, this later signal being indicated at reference 38. The duty cycle (and therefore power) of the output from the control 30 is proportional to the frequency of the input. The feed table speed (in feet per minute) is therefore set based on a proportionality constant, e.g., established by the optimal relationship of the feed table speed (20) to the rotor speed (2,000) or $1/100$. In this example, a slowing of the engine to 1,800 RPM produces a feed table speed of $1,800 \times 1/100$ or 18 feet per minute. The proportionality constant can be varied as explained above, as can the maximum and minimum speeds of the rotor and feed table.

Recall also that this variation takes place between a range of rotor engine RPM, e.g., 2,000 RPM down to 1,600 RPM at which point the system completely closes the proportional valve and drops the feed table speed to zero. This is illustrated in the chart of FIG. 5.

While this invention has been described in connection with a particular embodiment, those skilled in the art will recognize that this embodiment is capable of modification and that the invention is intended to cover any variations, uses or adaptations following, in general, the principles of the invention and including such departures from the present disclosure as come within known or customary practice in the art to which the invention pertains and as fall within the scope of the invention or the limits of the appended claims.

The invention claimed is:

1. A machine for bagging organic material comprising:

a movable chassis;

a tunnel mounted to the chassis including an inlet for receiving organic material and an outlet through which compressed organic material is inserted into a storage bag;

a rotor rotatively mounted proximal to the tunnel inlet and an engine rotatively driving said rotor for insertion of organic material into the storage bag and said engine being responsive to overloading of said rotor whereby rotation of the rotor and the engine are slowed;

an elongate feed table having a receiving end for receiving organic material to be bagged and a delivery end for delivering the material to the rotor;

a conveyor forming a part of said feed table for conveying the organic material at a variable rate of conveyance from the receiving end to the delivery end and thus to the rotor, a drive motor driving the conveyor and controlling the rate of conveyance; and a control system comprising a sensor sensing the rate of rotation of said rotor and producing a signal indicating the rate of rotation of the rotor, a conveyor control controlling the feed rate of the conveyor and a control unit receiving signals from said sensor and reactively conveying a signal to said conveyor control to speed up and slow down the conveyor in response to the rotation of the rotor.

2. A machine as defined in claim 1 wherein said drive motor for the conveyor is a hydraulic drive motor driven by hydraulic fluid and said conveyor control is a proportional valve, said control unit controlling said valve to adjust volumetric flow rate of hydraulic fluid to the hydraulic motor and thereby controlling the feed rate of said conveyor.

3. A machine as defined in claim 2 wherein said control unit includes a first and second setting, the first setting establishing a range of rotor revolutions per minute and directing a proportional slow down or speed up of the feed table in response thereto and said second setting establishing a lower limit of said range of rotor revolutions and directing full stopping of said conveyor below said lower limit.

* * * * *